US010647299B2

(12) United States Patent
Nordbruch

(10) Patent No.: US 10,647,299 B2
(45) Date of Patent: May 12, 2020

(54) METHOD AND APPARATUS FOR MONITORING A PARKED MOTOR VEHICLE

(71) Applicant: Robert Bosch GmbH, Stuttgart (DE)

(72) Inventor: Stefan Nordbruch, Kornwestheim (DE)

(73) Assignee: Robert Bosch GmbH, Stuttgart (DE)

( * ) Notice: Subject to any disclaimer, the term of this patent is extended or adjusted under 35 U.S.C. 154(b) by 88 days.

(21) Appl. No.: 15/859,849

(22) Filed: Jan. 2, 2018

(65) Prior Publication Data
US 2018/0194325 A1 Jul. 12, 2018

(30) Foreign Application Priority Data

Jan. 9, 2017 (DE) .................. 10 2017 200 160

(51) Int. Cl.
*B60R 25/30* (2013.01)
*B60R 25/10* (2013.01)
*B60R 25/20* (2013.01)

(52) U.S. Cl.
CPC ............ *B60R 25/305* (2013.01); *B60R 25/10* (2013.01); *B60R 25/209* (2013.01); *B60R 2325/205* (2013.01)

(58) Field of Classification Search
CPC .................................................. B60R 25/305
See application file for complete search history.

(56) References Cited

U.S. PATENT DOCUMENTS

| 9,544,549 | B2 * | 1/2017 | Vovkushevsky | B60R 1/00 |
| 9,711,047 | B1 * | 7/2017 | Knas | G08G 1/20 |
| 10,147,004 | B2 * | 12/2018 | Atsmon | H04N 7/185 |
| 2005/0240323 | A1 * | 10/2005 | Orita | B62D 15/027 |
| | | | | 701/28 |
| 2006/0007309 | A1 * | 1/2006 | Machinist | G08G 1/14 |
| | | | | 348/143 |
| 2010/0114488 | A1 * | 5/2010 | Khamharn | B60R 25/102 |
| | | | | 701/300 |

(Continued)

FOREIGN PATENT DOCUMENTS

| DE | 102014221745 A1 | 4/2016 |
| DE | 102014224079 A1 | 6/2016 |

(Continued)

*Primary Examiner* — Alex C Dunn
(74) *Attorney, Agent, or Firm* — Norton Rose Fulbright US LLP; Gerard Messina

(57) ABSTRACT

A method for monitoring a parked motor vehicle, including the following steps: monitoring an interior of the motor vehicle and/or a surrounding field of the motor vehicle with the aid of a monitoring infrastructure that is assigned to an infrastructure external relative to the parked motor vehicle; monitoring the interior of the motor vehicle and/or the surrounding field of the motor vehicle with the aid of one or more sensors onboard the motor vehicle; transmitting monitoring data based on both monitorings via a wireless communication network to a mobile terminal; in response to reception of a control command transmitted from the mobile terminal via the wireless communication network for controlling one or more components of the motor vehicle and/or for controlling one or more components of the external infrastructure, controlling the one or more corresponding components as a function of the control command.

14 Claims, 1 Drawing Sheet

(56) References Cited

U.S. PATENT DOCUMENTS

| | | | |
|---|---|---|---|
| 2012/0140073 A1 | 6/2012 | Ohta et al. | |
| 2012/0150966 A1* | 6/2012 | Fan | G06Q 10/107 709/206 |
| 2012/0162423 A1 | 6/2012 | Xiao et al. | |
| 2012/0299749 A1* | 11/2012 | Xiao | G08G 1/04 340/932.2 |
| 2015/0191152 A1 | 7/2015 | Gennermann | |
| 2015/0235379 A1* | 8/2015 | O'Gorman | G06K 9/00718 382/103 |
| 2015/0341599 A1* | 11/2015 | Carey | H04N 7/181 348/150 |
| 2016/0110999 A1* | 4/2016 | Bulan | G08G 1/0175 348/149 |
| 2017/0026354 A1* | 1/2017 | Reece | H04L 63/062 |
| 2017/0126934 A1* | 5/2017 | Abron | H04N 5/2252 |
| 2017/0225336 A1* | 8/2017 | Deyle | G01V 8/10 |
| 2017/0334380 A1* | 11/2017 | Bonnet | B62D 15/027 |
| 2019/0054927 A1* | 2/2019 | Hayakawa | B62D 15/0285 |

FOREIGN PATENT DOCUMENTS

| | | |
|---|---|---|
| EP | 2897014 A1 | 7/2015 |
| WO | 2016187243 A1 | 11/2016 |

* cited by examiner

METHOD AND APPARATUS FOR MONITORING A PARKED MOTOR VEHICLE

CROSS REFERENCE

The present application claims the benefit under 35 U.S.C. § 119 of German Patent Application No. DE 102017022160.7 filed on Jan. 9, 2017, which is expressly incorporated herein by reference.

FIELD

The present invention relates to a method and an apparatus for monitoring a parked motor vehicle. In addition, the present invention relates to an infrastructure, a motor vehicle, as well as a computer program.

BACKGROUND INFORMATION

For safety reasons, persons who are moving toward a parked motor vehicle in order to get in and drive away with it have an interest in obtaining information as to the extent to which the area surrounding the motor vehicle is safe. In particular, such persons usually want to know whether a stranger has broken into the motor vehicle during their absence from the vehicle.

Furthermore, already at a distance from the parked motor vehicle, thus, especially when there is no visual contact with the motor vehicle, there is a need to discover whether someone is trying illegally to gain access to the parked motor vehicle, thus, particularly to get into the parked vehicle.

German Patent Application No. DE 10 2014 224 079 A1 describes a method and an apparatus for monitoring a vehicle located within a parking facility.

German Patent Application No. DE 10 2014 221 745 A1 describes a method and a system for monitoring a vehicle in a parking facility.

SUMMARY

An object of the present invention is to provide efficient monitoring of a parked motor vehicle, which is able to supply a person efficiently with information about a surrounding field of the parked motor vehicle and about an interior of the parked motor vehicle, respectively.

Advantageous developments of the present invention are described herein.

According to one aspect, an example method is provided for monitoring a parked motor vehicle, including the following steps:

Monitoring an interior of the motor vehicle and/or a surrounding field of the motor vehicle with the aid of a monitoring infrastructure that is assigned to an infrastructure external relative to the parked motor vehicle;

Monitoring the interior of the motor vehicle and/or the surrounding field of the motor vehicle with the aid of one or more sensors onboard the motor vehicle;

Transmitting monitoring data based on both monitorings via a wireless communication network to a mobile terminal;

In response to reception of a control command transmitted from the mobile terminal via the wireless communication network for controlling one or more components of the motor vehicle and/or for controlling one or more components of the external infrastructure, controlling the one or more corresponding components as a function of the control command.

According to a further aspect of the present invention, an example apparatus is provided for monitoring a parked motor vehicle, including:

a communication device for transmitting monitoring data via a wireless communication network to a mobile terminal, the monitoring data being based on monitoring with the aid of a monitoring infrastructure that is assigned to an infrastructure external relative to the parked motor vehicle;

and for transmitting monitoring data via the wireless communication network to the mobile terminal, the monitoring data being based on monitoring with the aid of a monitoring device onboard the motor vehicle for monitoring the interior of the motor vehicle and/or the surrounding field of the motor vehicle, the monitoring device having one or more sensors onboard the motor vehicle;

the communication device being designed to receive a control command, transmitted from the mobile terminal via the wireless communication network, for controlling one or more components of the motor vehicle and/or for controlling one or more components of the external infrastructure; and a control device which is designed, in response to reception of the control command transmitted from the mobile terminal via the wireless communication network for controlling one or more components of the motor vehicle and/or for controlling one or more components of the external infrastructure, to control the one or more corresponding components as a function of the control command.

According to another aspect, an infrastructure is provided which includes the apparatus for monitoring a parked motor vehicle.

According to another aspect, a motor vehicle is provided which includes the apparatus for monitoring a parked motor vehicle.

According to another aspect, a computer program is provided which includes program code for carrying out the method for monitoring a parked motor vehicle, when the computer program is executed on a computer.

In accordance with the present invention, an example embodiment may achieve the above object by transmitting monitoring data, which is based both on monitoring by the motor vehicle and on monitoring by the infrastructure, to the mobile terminal. Thus, the mobile terminal is able to render the monitoring data in a form understandable for a person who is carrying the mobile terminal with him, so that accordingly, the person is able to monitor the area surrounding the motor vehicle and the motor-vehicle interior, respectively, from a distance.

The monitoring is based first of all on a monitoring infrastructure which is assigned not to the motor vehicle, but rather to the infrastructure within which the monitored motor vehicle is parked. That means, for example, that sensors which are external relative to the parked motor vehicle and are disposed within the infrastructure, in particular, are disposed in stationary manner, are used for the monitoring.

Secondly, the monitoring is based on sensors of the parked motor vehicle.

Thus, a multitude of sensors are available for efficient monitoring. Since, generally, one sensor alone is not able to monitor the entire surrounding field of the motor vehicle and the entire interior of the motor vehicle, respectively, the monitoring infrastructure of the infrastructure offboard the motor vehicle and the sensors onboard the motor vehicle are able to efficiently and optimally complement each other.

For example, monitoring data based on monitoring with the aid of the sensors onboard the motor vehicle may be referred to as vehicle-internal monitoring data.

For example, monitoring data based on monitoring with the aid of the monitoring infrastructure may be referred to as vehicle-external monitoring data.

Therefore, the monitoring data which are transmitted to the mobile terminal include both vehicle-internal monitoring data and vehicle-external monitoring data.

A monitoring infrastructure for the purpose of the specification includes, namely, one or more of the following sensors: Video sensor, especially video sensor of a video camera, particularly a 3-D video camera, radar sensor, ultrasonic sensor, lidar sensor, photoelectric-barrier sensor, motion sensor, infrared sensor, magnetic sensor, audio sensor, especially microphone.

According to one specific embodiment, each of the one or more sensors onboard the motor vehicle is an element selected from the following group of sensors: motor-vehicle interior video camera, motor-vehicle exterior video camera, radar sensor, ultrasonic sensor, lidar sensor, door sensor, trunk-door sensor, motion sensor, infrared sensor, magnetic sensor, motor-vehicle seat sensor and steering-wheel sensor.

A motor-vehicle interior video camera and/or a motor-vehicle exterior video camera within the meaning of the specification especially includes a video sensor.

A motor-vehicle interior video camera denotes a video camera that monitors the interior of the motor vehicle.

A motor-vehicle exterior video camera denotes a video camera that monitors the area surrounding the motor vehicle.

For example, a video camera in terms of the specification is a 3-D video camera.

A door sensor within the meaning of the specification is designed to sense an opening of a motor-vehicle door.

A trunk-door sensor within the meaning of the specification is designed to sense an opening of a trunk door of the motor vehicle.

A motion sensor within the meaning of the specification is designed to sense a movement in the area surrounding the motion sensor.

A motor-vehicle seat sensor within the meaning of the specification is designed to sense when a person is on the motor-vehicle seat corresponding to the motor-vehicle seat sensor.

A steering-wheel sensor within the meaning of the specification is designed, in particular, to sense an actuation of the steering wheel.

For example, the mobile terminal displays an image of the surrounding field of the motor vehicle and/or of the vehicle interior corresponding to the monitoring data.

For instance, the image corresponds to a sensor image. For example, a sensor image is a video image, provided the sensor is a video sensor. If, illustratively, the sensor is a radar sensor, then, for example, the mobile terminal displays a radar image. This holds true correspondingly for further sensors.

The person who is carrying the mobile terminal with him is thus able to decide whether it is necessary that one or more infrastructure components and/or motor-vehicle components be operated or controlled. If the person decides that relevant components must be operated, using the mobile terminal, he transmits a corresponding control command for controlling the one or more components.

The one or more components is/are then controlled in response to reception of the control command transmitted accordingly from the mobile terminal via the wireless communication network.

According to one specific embodiment, the one or more motor-vehicle components is/are selected from the following group of motor-vehicle components: motor-vehicle lighting, motor-vehicle horn, sensor onboard the motor vehicle, drive motor of the motor vehicle.

In other words, the person who is carrying the mobile terminal with him is able to control the motor-vehicle lighting and/or the motor-vehicle horn and/or one or more of the sensors onboard the motor vehicle and/or the drive motor of the motor vehicle from a distance.

Thus, these motor-vehicle components are operated here by remote control.

According to one specific embodiment, the group of motor-vehicle components includes a drive motor of the motor vehicle, the control including starting-up of the drive motor.

For example, this yields the technical advantage that the parked motor vehicle is ready to drive off immediately when the person who is carrying the mobile terminal with him and is moving toward the parked motor vehicle, has arrived at the motor vehicle.

In one specific embodiment, the one or more infrastructure components is/are selected from the following group of infrastructure components: Sensor of the monitoring infrastructure, lighting device of the infrastructure, signaling device of the infrastructure.

For example, a lighting device of the infrastructure includes one or more illuminants, e.g., light-emitting diodes and/or floodlights. The control includes, e.g., activation of the lighting device, thus, especially activation of the one or more illuminants. In particular, the person is thus able to switch on the lighting device remotely.

Notably, the one or more illuminants of the lighting device of the infrastructure are distributed within the infrastructure, in particular, are disposed in stationary fashion within the infrastructure.

For example, a signaling device of the infrastructure includes one or more signal generators for the output of a signal. For instance, a signal generator is an acoustic signal generator; the signal output is then an acoustic signal. For example, a signal generator is an optical signal generator; the signal output is then an optical signal. Notably, the control includes activation of the signaling device, thus, especially activation of the one or more signal generators. In particular, the person is thus able to switch on the signaling device remotely.

For example, a sensor of the monitoring infrastructure is one of the sensors described above. In particular, the person is thus able to control the monitoring infrastructure remotely.

The person is therefore able to react adequately to a potential threat in the area surrounding the motor vehicle and/or in the interior of the vehicle.

As a result, efficient protection is thereby ensured for a person who is carrying a mobile terminal with him and is going to the parked motor vehicle.

This is because, first of all, based on the monitoring, the person recognizes whether there is possibly a stranger in the passenger compartment or in the area surrounding the motor vehicle. And secondly, he is able to efficiently chase away a stranger who may be present by, for example, activating a motor-vehicle lighting or a motor-vehicle horn or a lighting device of the infrastructure or a signaling device of the infrastructure. In particular, the stranger may be monitored efficiently by suitable control of the sensor onboard the motor vehicle and the sensor of the monitoring infrastructure, respectively. Thus, for example, if the stranger moves, the person who is carrying the mobile terminal with him is able, using a suitable control command, to control the corresponding sensor in such a way that it tracks the unfamiliar person.

In particular, the control of the motor-vehicle lighting includes activation of the motor-vehicle lighting, thus, especially activation of one or more of the motor-vehicle lighting devices indicated below.

Specifically, a motor-vehicle lighting includes one or more of the following motor-vehicle lighting devices: high beam, low beam, sidelight, parking light, direction indicator, fog light, adaptive front lighting system, daytime running light, taillight, brake light, reflector, license-plate illumination, fog tail light, backup light, side marker light, motor-vehicle interior lighting.

For example, the control of the motor-vehicle horn includes activation of the motor-vehicle horn.

A control of the sensor onboard the motor vehicle includes, for example, swinging the sensor horizontally or rotating the sensor or moving the sensor in order to track a stranger moving in the interior of the motor vehicle or in the area surrounding the motor vehicle.

For example, elements of the infrastructure, especially of the monitoring infrastructure, may additionally be denoted by the formulation "external," in order to stress even more clearly that these elements do not belong to the motor vehicle, but rather to the infrastructure.

For example, elements of the motor vehicle may additionally be denoted by the formulation "internal," in order to stress even more clearly that these elements do not belong to the infrastructure, but rather to the motor vehicle.

According to one specific embodiment, the one or more sensors onboard the motor vehicle include an internal video camera, so that the monitoring data include video images of the internal video camera, the control including control of the internal video camera, the control of the internal video camera including one or more of the following steps: Altering a focal length of an objective of the internal video camera, swinging the internal video camera horizontally, rotating the internal video camera, moving the internal video camera, altering a photographic parameter, especially exposure time and/or diaphragm, of the internal video camera.

Notably, this results in the technical advantage that the monitoring may be carried out efficiently. Thus, for example, by altering a focal length of an objective of the video camera, it is possible to zoom in selectively on an unfamiliar person in the interior of the motor vehicle or in the area surrounding the motor vehicle.

In particular, rotating or moving or swinging the video camera horizontally yields the technical advantage that an unfamiliar person is able to be tracked efficiently if he moves out of a working range of the video camera.

For example, altering a photographic parameter, especially an exposure time or a diaphragm, of the video camera results in the technical advantage that the video images are able to be recorded efficiently. Thus, for instance, it is possible to react efficiently to different lighting conditions.

In one specific embodiment, the monitoring infrastructure includes an external video camera, so that the monitoring data include video images of the external video camera, the control including control of the external video camera, the control of the external video camera including one or more of the following steps: Altering a focal length of an objective of the external video camera, swinging the external video camera horizontally, rotating the external video camera, moving the external video camera, altering a photographic parameter, especially exposure time and/or diaphragm, of the external video camera.

The advantages resulting from these steps are analogous to the advantages as were described above in connection with the video camera of the parked motor vehicle.

According to one specific embodiment, a distance is ascertained between the parked motor vehicle and the mobile terminal, the ascertained distance being compared to a predetermined distance threshold value, the monitoring data not being transmitted to the mobile terminal until the ascertained distance is less than, or equal to/less than the predetermined distance threshold value.

For example, this yields the technical advantage that by specifying the distance threshold value, it is possible to efficiently influence when the monitoring data are transmitted to the mobile terminal. In particular, the specification of a suitable distance threshold value is able to ensure efficiently that the person who is carrying the mobile terminal with him is only informed about the area surrounding the motor vehicle or about the vehicle interior when the corresponding information is relevant for this person, thus, especially when this person is suitably close to the motor vehicle.

According to one specific embodiment, the mobile terminal is a cell phone.

According to one specific embodiment, the mobile terminal is a watch, especially a Smartwatch.

According to one specific embodiment, the wireless communication network includes a cellular communication network and/or a WLAN communication network and/or a Bluetooth communication network.

For example, a cellular communication network includes a GSM communication network and/or an LTE communication network.

In particular, that means that the mobile terminal and the apparatus therefore communicate in wireless or cable-less fashion via radio, thus, especially via mobile radiocommunication or WLAN or Bluetooth.

In particular, the mobile terminal is carried along by a person.

For instance, this person who is carrying the mobile terminal with him is a future driver of the parked motor vehicle or a future passenger of the parked motor vehicle.

A stranger who is in the area surrounding the motor vehicle or in the interior of the motor vehicle is therefore not the future driver or the future passenger of the motor vehicle.

According to one specific embodiment, the person who is carrying the mobile terminal with him is moving toward the parked motor vehicle.

To ascertain the distance between the parked motor vehicle and the mobile terminal, it is provided, for example, that position data, e.g., GPS position data, sent out from the mobile terminal via the wireless communication network are received, the distance being determined based on the received position data.

In one specific embodiment, a distance is ascertained between the parked motor vehicle and the mobile terminal, the ascertained distance being compared to a predetermined further distance threshold value, the monitoring of the motor-vehicle interior and/or the area surrounding the motor vehicle not being started until the ascertained distance is less than, or equal to/less than the predetermined further distance threshold value.

To ascertain the distance between the parked motor vehicle and the mobile terminal, it is provided, for example, that position data, e.g., GPS position data, sent out from the mobile terminal via the wireless communication network are received, the distance being determined based on the received position data.

In another specific embodiment, a route from a present position of the mobile terminal to the parked motor vehicle is determined and transmitted via the wireless communication network to the mobile terminal, at least a portion of the route being monitored with the aid of the monitoring infrastructure and/or with the aid of the one or more sensors onboard the motor vehicle.

For example, this provides the technical advantage that if the person follows the ascertained route, he is able to monitor at least a portion of the route. For instance, protection is thereby increased efficiently for this person on his way to the parked motor vehicle.

In another specific embodiment, a route from a present position of the mobile terminal to the parked motor vehicle is transmitted from the mobile terminal via the wireless communication network to the monitoring infrastructure and/or to the parked motor vehicle, at least a portion of the route being monitored with the aid of the monitoring infrastructure and/or with the aid of the one or more sensors onboard the motor vehicle.

For example, this provides the technical advantage that if the person follows the ascertained route, he is able to monitor at least a portion of the route. For instance, protection is thereby increased efficiently for this person on his way to the parked motor vehicle.

According to one specific embodiment, the route is determined by the mobile terminal.

According to one specific embodiment, the route is determined by the person.

In one specific embodiment, a plurality of routes are ascertained from a present position of the mobile terminal to the parked motor vehicle, the plurality of routes being provided, e.g., displayed to the person for selection, and in response to detecting a selection by the person, the route corresponding to the selection being at least partially monitored with the aid of the monitoring infrastructure and/or with the aid of the one or more sensors onboard the motor vehicle.

According to one specific embodiment, a route, especially the plurality of routes, is/are determined by the apparatus and/or by the mobile terminal.

According to one specific embodiment, based on a biometric recognition of a person who is carrying the mobile terminal with him, with the aid of the monitoring infrastructure and/or with the aid of the one or more sensors onboard the motor vehicle, a present position of the recognized person is ascertained, the position of the mobile terminal being determined based on the ascertained position of the person.

For example, this provides the technical advantage that the position of the mobile terminal may be determined efficiently.

Thus, it is specifically provided here that a biometric recognition of the person is carried out using the monitoring infrastructure and/or the one or more sensors onboard the motor vehicle. For example, the person is recognized based on a facial analysis or gait analysis or voice analysis. Since a specific position of the sensors of the monitoring infrastructure used for this purpose is known, based on the known position, it is therefore possible to determine a position of the person. For example, distance-measuring sensors of the motor vehicle, e.g., radar sensors and/or ultrasonic sensors, are used to determine a distance of the person from the motor vehicle. Since the position of the motor vehicle is known, e.g., via GPS, the position of the person may thus be determined in advantageous manner.

Since the person is carrying the mobile terminal with him, it may thus be assumed that the ascertained position of the person corresponds to the person with the mobile terminal.

For example, a position of the mobile terminal, determined based on position data, e.g., GPS position data, may be matched with the ascertained position of the person.

According to one specific embodiment, the infrastructure and the motor vehicle, respectively, are designed or equipped to carry out or implement the method for monitoring a parked motor vehicle.

In another specific embodiment, the apparatus for monitoring a parked motor vehicle is designed or equipped to implement or carry out the method for monitoring a parked motor vehicle.

According to one specific embodiment, the method for monitoring a parked motor vehicle is carried out or implemented with the aid of the apparatus for monitoring a parked motor vehicle.

Technical functionalities of the apparatus for monitoring a parked motor vehicle are obtained directly from corresponding technical functionalities of the method for monitoring a parked motor vehicle and vice versa.

That means, in particular, that apparatus features are thus derived from corresponding method features and vice versa.

In one specific embodiment, the infrastructure includes the monitoring infrastructure.

In one specific embodiment, the motor vehicle includes one or more of the following motor-vehicle components: motor-vehicle lighting, motor-vehicle horn, monitoring device onboard the motor vehicle, including one or more sensors onboard the motor vehicle, drive motor.

A surrounding field of the motor vehicle denotes, specifically, an area around the motor vehicle up to a maximum distance of, e.g., 50 m, especially 25 m, e.g., 15 m, especially 10 m, e.g., 5 m, especially 3 m.

An infrastructure for the purpose of the specification includes especially one or more infrastructure elements. For example, the sensors of the monitoring infrastructure and/or the lighting device of the infrastructure and/or the signaling device of the infrastructure is/are disposed on the one or more infrastructure elements.

An infrastructure element within the meaning of the specification is, e.g., one of the following infrastructure elements: ceiling, floor, column, wall, doorframe, post, especially lamp post, pole, especially lamp pole, traffic light, building, roof.

In one specific embodiment, the communication device includes a first communication interface for transmitting monitoring data via the wireless communication network to the mobile terminal, the monitoring data being based on the monitoring with the aid of the monitoring infrastructure.

In one specific embodiment, the communication device includes a second communication interface for transmitting monitoring data via the wireless communication network to the mobile terminal, the monitoring data being based on monitoring with the aid of the monitoring device onboard the motor vehicle for monitoring the interior of the motor vehicle and/or the surrounding field of the motor vehicle.

For example, the first communication interface is included by the infrastructure, thus, is assigned to it. For instance, the first communication interface is disposed in stationary manner within the infrastructure.

For example, the second communication interface is included by the motor vehicle, thus, is assigned to it. For instance, the second communication interface is disposed on or in the motor vehicle.

In one specific embodiment, the control device includes a first control device for controlling the one or more infrastructure components in accordance with the control command. The first control device is included by the infrastructure, for example.

In one specific embodiment, the control device includes a second control device for controlling the one or more motor-vehicle components in accordance with the control command. The second control device is included [by the] motor vehicle, for instance.

In one specific embodiment, the vehicle-internal monitoring data are transmitted with the aid of the motor vehicle via the wireless communication network to the communication device, which according to this specific embodiment, is assigned to the infrastructure.

In one specific embodiment, the vehicle-external monitoring data are transmitted with the aid of the infrastructure via the wireless communication network to the communication device included by the parked motor vehicle.

According to one specific embodiment, the control device is included by the infrastructure, thus, is assigned to it. According to this specific embodiment, the control device then operates the one or more motor-vehicle components by remote control, in accordance with the control command.

According to one specific embodiment, the control device is included by the parked motor vehicle, thus, is assigned to it. According to this specific embodiment, the control device then operates the one or more infrastructure components by remote control, in accordance with the control command.

In one specific embodiment, the monitoring data are stored. In particular, storing constitutes archiving.

For example, this provides the technical advantage that the monitoring data may also be checked or analyzed at a later time, so that the situation existing at the moment may be analyzed again at the later time.

Preferably, the monitoring data are stored on the mobile terminal.

Preferably, the monitoring data are stored on a network server.

Preferably, the monitoring data are stored on the apparatus.

For example, the infrastructure is a parking facility, e.g., a parking block or a parking garage.

In one specific embodiment, in response to the reception of the control command, a message is transmitted via the wireless communication network to a network address, the message including the information that a control command was received.

For example, this yields the technical advantage that the information, that a control command was received, may be provided efficiently and remotely via the wireless communication network. The control command is, of course, an indication that a person, who is monitoring the surrounding field and/or the interior of the motor vehicle from a distance using the monitoring data, was induced to transmit a control command. This information with respect to the inducement should be made available to the service staff of the infrastructure, for example, so that, for instance, the service staff gains knowledge about unusual occurrences, and therefore may react to them.

In other words, for example, the network address is thus assigned to a computer to which a service staff of the infrastructure has access. For instance, the network address is assigned to a further mobile terminal. The further mobile terminal is carried along by the service staff, for example.

In one specific embodiment, calculations are performed locally on the mobile terminal and/or remotely in a cloud infrastructure that includes the apparatus, for example.

Calculations within the meaning of the specification include processing of the monitoring data, for instance.

Processing of the monitoring data includes, for example, that information is added to the sensor data of the sensors, e.g., a specification of distance with respect to objects in the sensor images.

Processing of the monitoring data includes, for example, that the sensor images are corrected, e.g., the brightness and/or contrast is/are altered.

Processing of the monitoring data includes, for example, the implementation of a biometric recognition of a person recorded in the sensor images, who is thus located, for example, in the surrounding field of the motor vehicle or in the interior of the motor vehicle or on the route ascertained above.

For example, processing of the monitoring data includes an analysis of the monitoring data.

In particular, the formulation "and . . . , respectively" includes the formulation "and/or."

The present invention is explained in greater detail below on the basis of preferred exemplary embodiments.

DETAILED DESCRIPTION OF EXAMPLE EMBODIMENTS

Figure 1:
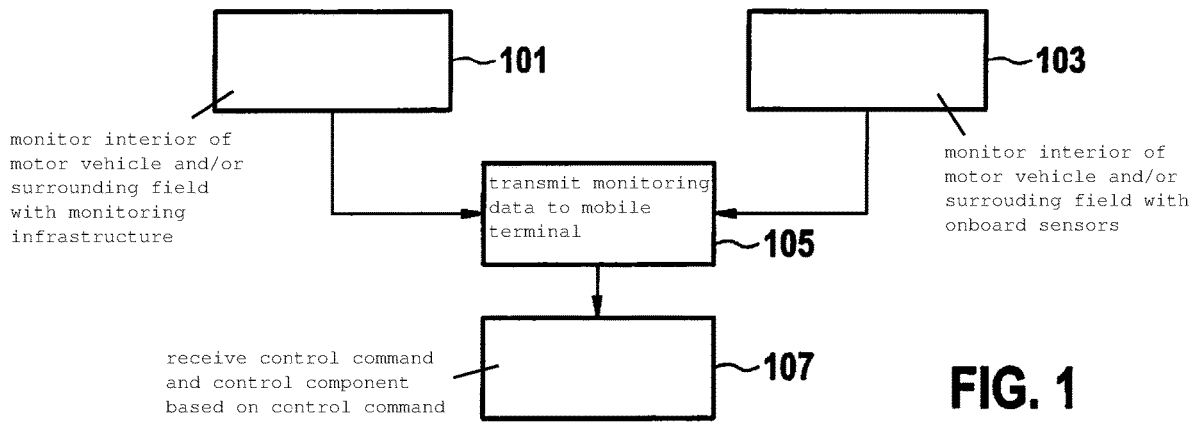
FIG. 1 shows a flowchart of a method for monitoring a parked motor vehicle.

FIG. 1 shows a flowchart of an example method for monitoring a parked motor vehicle.

The method includes the following steps:
Monitoring 101 an interior of the motor vehicle and/or a surrounding field of the motor vehicle with the aid of a monitoring infrastructure that is assigned to an infrastructure external relative to the parked motor vehicle;
Monitoring 103 the interior of the motor vehicle and/or the surrounding field of the motor vehicle with the aid of one or more sensors onboard the motor vehicle;
Transmitting 105 monitoring data based on both monitorings via a wireless communication network to a mobile terminal;
In response to reception of a control command transmitted from the mobile terminal via the wireless communication network for controlling one or more components of the motor vehicle and/or for controlling one or more components of the external infrastructure, controlling 107 the one or more corresponding components as a function of the control command.

Figure 2:
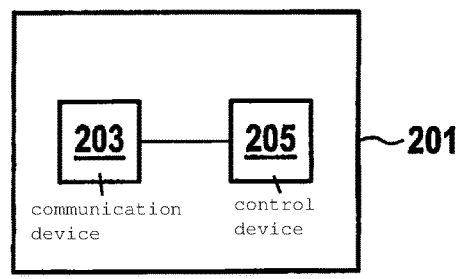
FIG. 2 shows an apparatus for monitoring a parked motor vehicle.

FIG. 2 shows an apparatus 201 for monitoring a parked motor vehicle.

Apparatus 201 includes:
a communication device 203 for transmitting monitoring data via a wireless communication network to a mobile terminal, the monitoring data being based on monitoring with the aid of a monitoring infrastructure that is assigned to an infrastructure external relative to the parked motor vehicle;

and for transmitting monitoring data via the wireless communication network to the mobile terminal, the monitoring data being based on monitoring with the aid of a monitoring device onboard the motor vehicle for monitoring the interior of the motor vehicle and/or the surrounding field of the motor vehicle, the monitoring device having one or more sensors onboard the motor vehicle;

communication device 203 being designed to receive a control command, transmitted from the mobile terminal via the wireless communication network, for controlling one or more components of the motor vehicle and/or for controlling one or more components of the external infrastructure; and a control device 205 which is designed, in response to reception of the control command transmitted from the mobile terminal via the wireless communication network for controlling one or more components of the motor vehicle and/or for controlling one or more components of the external infrastructure, to control the one or more corresponding components as a function of the control command.

Figure 3:
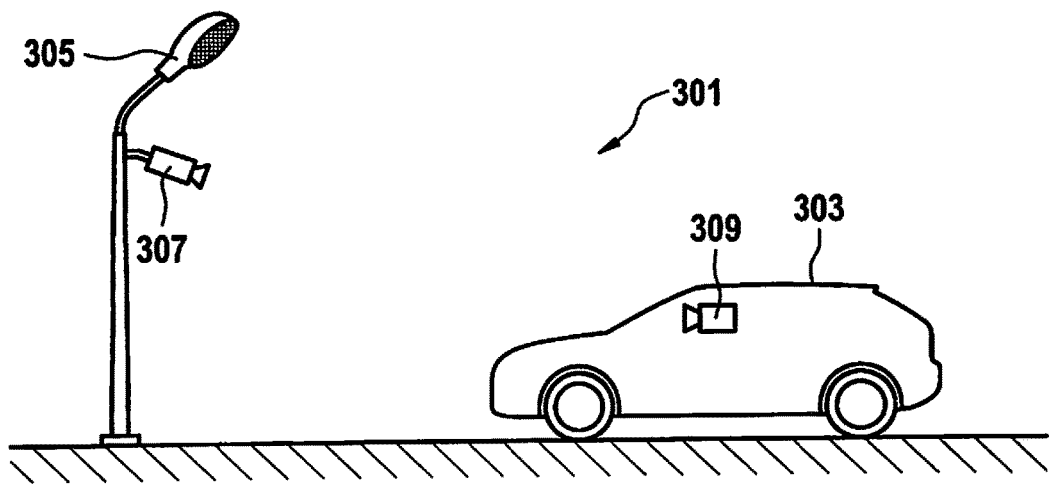
FIG. 3 shows an infrastructure, within which a motor vehicle is parked.

FIG. 3 shows an infrastructure 301, within which a motor vehicle 303 is parked.

Infrastructure 301 includes a streetlight 305, on which a video camera 307 is secured. Video camera 307 monitors parked motor vehicle 303. Streetlight 305 is switched off.

Motor vehicle 303 includes a video camera 309. Video camera 309 monitors a surrounding field of motor vehicle 303.

Video camera 307 of infrastructure 301 includes a communication interface, not shown here, which corresponds to the first communication interface indicated above, for example, and which transmits the video images of video camera 307 via a wireless communication network to a mobile terminal.

Motor vehicle 303 includes a communication interface, not shown here, which corresponds to the second communication interface indicated above, for example, and which transmits the video images of video camera 309 via the wireless communication network to the mobile terminal.

The video images of both video cameras 307, 309 are thus transmitted as monitoring data to the mobile terminal via the wireless communication network. For example, the mobile terminal is carried by a person who is moving toward parked motor vehicle 303 in order to get into it.

For example, the mobile terminal displays the video images of both video cameras 307, 309 with the aid of a screen. If the person believes that he has discovered a suspicious activity in the video images, using the mobile terminal, the person then transmits a control command via the wireless communication network to the communication interface of video camera 305, which passes on the received control command to a control device (not shown) of the infrastructure (the first control device indicated above,) the control command including activation of streetlight 305.

In response to receiving the control command, control device 205 switches on streetlight 305.

Parked motor vehicle 303 thus becomes better illuminated, so that, for example, the person is able to recognize more details in the video images in order, for instance, to more precisely analyze the suspicious activity.

For example, using the mobile terminal, the person transmits a control command via the wireless communication network to the communication interface of motor vehicle 303, which passes on the received control command to a control device (not shown) of motor vehicle 303 (the second control device indicated above), the control command including activation of a motor-vehicle lighting (not shown) of parked motor vehicle 303, so that the control device of the motor vehicle switches on the vehicle lighting in response to receiving the control command. For instance, switching on the automotive lighting may chase away a suspicious person in the area surrounding motor vehicle 303.

Thus, the present invention specifically includes supplying monitoring data to a person who is carrying a mobile terminal with him (transmitting the monitoring data to the mobile terminal) and is going to his parked motor vehicle, this monitoring data being based on monitoring of the motor-vehicle interior and/or the surrounding field of the parked motor vehicle using a monitoring infrastructure offboard the motor vehicle and one or more sensors onboard the motor vehicle. The monitoring of the surrounding field and/or the interior is thus based on data, which may also be referred to as sensor data, of sensors offboard the motor vehicle and sensors onboard the motor vehicle.

For example, the person moving toward the parked motor vehicle may transmit a control command via the wireless communication network to the control device of the infrastructure. One or more components of the motor vehicle and/or one or more infrastructure components, for instance, is/are then controlled accordingly.

Thus, according to one specific embodiment, for example, a street lighting (e.g., a streetlight) is activated or switched on, which advantageously is able to improve monitoring. In particular, if the monitoring is based on monitoring by video cameras, by improving the illumination of the surrounding field or the interior, better illuminated video images are able to be recorded.

For example, a signaling device of the infrastructure is activated, which, e.g., is able to scare away a stranger who is in the interior of the motor vehicle without permission.

According to one specific embodiment, for example, motor-vehicle components, e.g., a drive motor of the motor vehicle, which are needed for entering the vehicle and driving away, are started prior to entering.

According to one specific embodiment, for example, the group of motor-vehicle components includes a motor-vehicle door, especially a driver-side door, the control including opening of the motor-vehicle door. For this opening, a motor, especially an electric motor, is provided, for example, which opens the motor-vehicle door.

What is claimed is:

1. A method for monitoring a parked motor vehicle, comprising:

monitoring, with the aid of a monitoring infrastructure that is assigned to an infrastructure external relative to the parked motor vehicle, at least one of an interior of the motor vehicle and a surrounding field of the motor vehicle;

monitoring, with the aid of one or more sensors onboard the motor vehicle, at least one of the interior of the motor vehicle and the surrounding field of the motor vehicle;

transmitting monitoring data based on both the monitoring with the external infrastructure and the monitoring with the sensors of the vehicle, the transmitting being via a wireless communication network to a mobile terminal; and in response to reception of a control command transmitted from the mobile terminal via the wireless communication network for controlling at least one of: (i) a component of the motor vehicle, and (ii) a component of the external infrastructure, controlling the at least one of the component of the motor vehicle and the component of the external infrastructure, as a function of the control command, wherein a distance is ascertained between the parked motor vehicle and the mobile terminal, the ascertained distance being compared to a predetermined distance threshold value, the monitoring of the at least one of the interior of the motor vehicle and the surrounding field of the motor vehicle not being started until the ascertained distance is equal to or less than the predetermined distance threshold value.

2. The method as recited in claim 1, wherein the monitoring infrastructure includes an external video camera, so that the monitoring data include video images of the external video camera, the control including control of the external video camera, the control of the external video camera including one or more of the following steps: (i) altering a focal length of an objective of the external video camera, (ii) swinging the external video camera horizontally, (iii) rotating the external video camera, (iv) moving the external video camera, and (v) altering a photographic parameter of the external video camera, the photographic parameter including at least one of exposure time and diaphragm.

3. The method as recited in claim 1, wherein the motor-vehicle component is selected from at least one of the following group of motor-vehicle components: motor-vehicle lighting, motor-vehicle horn, sensor onboard the motor vehicle, and drive motor of the motor vehicle.

4. The method as recited in claim 3, wherein the control includes starting up the drive motor.

5. The method as recited in claim 3, wherein the sensors onboard the motor vehicle include an internal video camera, so that the monitoring data include video images of the internal video camera, the control including control of the internal video camera, the control of the internal video camera including one or more of the following steps: (i) altering a focal length of an objective of the internal video camera, (ii) swinging the internal video camera horizontally, (iii) rotating the internal video camera, (iv) moving the internal video camera, and (v) altering a photographic parameter of the internal video camera, the photographic parameter including at least one of exposure time and diaphragm.

6. The method as recited in claim 1, wherein a route from a present position of the mobile terminal to the parked motor vehicle is determined and transmitted via the wireless communication network to the mobile terminal, at least a portion of the route being monitored with the aid of one of the monitoring infrastructure, and the sensors onboard the motor vehicle.

7. The method as recited in claim 1, wherein a route from a present position of the mobile terminal to the parked motor vehicle is transmitted from the mobile terminal via the wireless communication network to at least one of the monitoring infrastructure and the parked motor vehicle, at least a portion of the route being monitored with the aid of at least one of the monitoring infrastructure, and the sensors onboard the motor vehicle.

8. The method as recited in claim 1, wherein based on a biometric recognition of a person who is carrying the mobile terminal with him, with the aid of at least one of the monitoring infrastructure and the sensors onboard the motor vehicle, a present position of the recognized person is ascertained, the position of the mobile terminal being determined based on the ascertained position of the person.

9. The method as recited in claim 1, wherein the monitoring data are stored on the mobile terminal.

10. The method as recited in claim 1, wherein in response to the reception of the control command, a message is transmitted via the wireless communication network to a network address, the message including the information that a control command was received.

11. An apparatus for monitoring a parked motor vehicle, comprising:
a communication device for transmitting monitoring data via a wireless communication network to a mobile terminal, the monitoring data being based on monitoring with the aid of a monitoring infrastructure that is assigned to an infrastructure external relative to the parked motor vehicle, and for transmitting monitoring data via the wireless communication network to the mobile terminal, the monitoring data being based on monitoring with the aid of a monitoring device onboard the motor vehicle for monitoring at least one of the interior of the motor vehicle and the surrounding field of the motor vehicle, the monitoring device having one or more sensors onboard the motor vehicle, the communication device being designed to receive a control command, transmitted from the mobile terminal via the wireless communication network, for at least one of controlling one or more components of the motor vehicle and for controlling one or more components of the external infrastructure; and
a control device designed, in response to reception of the control command transmitted from the mobile terminal via the wireless communication network for at least one of controlling one or more components of the motor vehicle and controlling one or more components of the external infrastructure, to control the one or more corresponding components as a function of the control command, wherein a distance is ascertained between the parked motor vehicle and the mobile terminal, the ascertained distance being compared to a predetermined distance threshold value, the monitoring of the at least one of the interior of the motor vehicle and the surrounding field of the motor vehicle not being started until the ascertained distance is equal to or less than the predetermined distance threshold value.

12. An infrastructure, including an apparatus for monitoring a parked motor vehicle, the apparatus comprising:
a communication device for transmitting monitoring data via a wireless communication network to a mobile terminal, the monitoring data being based on monitoring with the aid of a monitoring infrastructure that is assigned to an infrastructure external relative to the parked motor vehicle, and for transmitting monitoring data via the wireless communication network to the mobile terminal, the monitoring data being based on monitoring with the aid of a monitoring device onboard the motor vehicle for monitoring at least one of the interior of the motor vehicle and the surrounding field of the motor vehicle, the monitoring device having one or more sensors onboard the motor vehicle, the communication device being designed to receive a control command, transmitted from the mobile terminal via the wireless communication network, for at least one of controlling one or more components of the motor vehicle and for controlling one or more components of the external infrastructure; and a control device designed, in response to reception of the control command transmitted from the mobile terminal via the wireless communication network for at least one of controlling one or more components of the motor vehicle and controlling one or more components of the external infrastructure, to control the one or more corresponding components as a function of the control command, wherein a distance is ascertained between the parked motor vehicle and the mobile terminal, the ascertained distance being compared to a predetermined distance threshold value, the monitoring data of the at least one of the interior of the motor vehicle and the surrounding field of the motor vehicle not being started until the ascertained distance is equal to or less than the predetermined distance threshold value.

13. A motor vehicle, including an apparatus for monitoring a parked motor vehicle, the apparatus comprising:
a communication device for transmitting monitoring data via a wireless communication network to a mobile terminal, the monitoring data being based on monitoring with the aid of a monitoring infrastructure that is assigned to an infrastructure external relative to the parked motor vehicle, and for transmitting monitoring data via the wireless communication network to the mobile terminal, the monitoring data being based on monitoring with the aid of a monitoring device onboard the motor vehicle for monitoring at least one of the interior of the motor vehicle and the surrounding field of the motor vehicle, the monitoring device having one or more sensors onboard the motor vehicle, the communication device being designed to receive a control command, transmitted from the mobile terminal via the wireless communication network, for at least one of controlling one or more components of the motor vehicle and for controlling one or more components of the external infrastructure; and
a control device designed, in response to reception of the control command transmitted from the mobile terminal via the wireless communication network for at least one of controlling one or more components of the motor vehicle and controlling one or more components of the external infrastructure, to control the one or more corresponding components as a function of the control command, wherein a distance is ascertained between the parked motor vehicle and the mobile terminal, the ascertained distance being compared to a predetermined distance threshold value, the monitoring of the at least one of the interior of the motor vehicle and the surrounding field of the motor vehicle not being started until the ascertained distance is equal to or less than the predetermined distance threshold value.

14. A non-transitory computer-readable storage medium on which is stored a computer program for monitoring a parked motor vehicle, the computer program, when executed by a processor, causing the processor to perform:
monitoring, with the aid of a monitoring infrastructure that is assigned to an infrastructure external relative to the parked motor vehicle, at least one of an interior of the motor vehicle and a surrounding field of the motor vehicle;
monitoring, with the aid of one or more sensors onboard the motor vehicle, at least one of the interior of the motor vehicle and the surrounding field of the motor vehicle;
transmitting monitoring data based on both the monitoring with the external infrastructure and the monitoring with the sensors of the vehicle, the transmitting being via a wireless communication network to a mobile terminal; and
in response to reception of a control command transmitted from the mobile terminal via the wireless communication network for controlling at least one of: (i) a component of the motor vehicle, and (ii) a component of the external infrastructure, controlling the at least one of the component of the motor vehicle and the component of the external infrastructure, as a function of the control command, wherein a distance is ascertained between the parked motor vehicle and the mobile terminal, the ascertained distance being compared to a predetermined distance threshold value, the monitoring of the at least one of the interior of the motor vehicle and the surrounding field of the motor vehicle not being started until the ascertained distance is equal to or less than the predetermined distance threshold value.

* * * * *